(12) United States Patent
Shuster

(10) Patent No.: US 9,286,507 B2
(45) Date of Patent: Mar. 15, 2016

(54) ONLINE IDENTITY VERIFICATION

(71) Applicant: Gary S. Shuster, Fresno, CA (US)

(72) Inventor: Gary S. Shuster, Fresno, CA (US)

(73) Assignee: Gary S. Shuster, Fresno, CA (US)

( * ) Notice: Subject to any disclaimer, the term of this patent is extended or adjusted under 35 U.S.C. 154(b) by 103 days.

(21) Appl. No.: 14/077,125

(22) Filed: Nov. 11, 2013

(65) Prior Publication Data

US 2014/0064573 A1   Mar. 6, 2014

Related U.S. Application Data

(63) Continuation of application No. 13/288,844, filed on Nov. 3, 2011, now Pat. No. 8,582,829.

(60) Provisional application No. 61/409,833, filed on Nov. 3, 2010.

(51) Int. Cl.
*G06K 9/00* (2006.01)

(52) U.S. Cl.
CPC ........ *G06K 9/00228* (2013.01); *G06K 9/00912* (2013.01)

(58) Field of Classification Search
None
See application file for complete search history.

(56) References Cited

U.S. PATENT DOCUMENTS

| | | | |
|---|---|---|---|
| 4,821,118 A * | 4/1989 | Lafreniere | G07C 9/00079 348/150 |
| 5,952,641 A | 9/1999 | Korshun | |
| 6,072,894 A | 6/2000 | Payne | |
| 6,311,272 B1 | 10/2001 | Gressel | |
| 6,535,223 B1 | 3/2003 | Foley | |
| 7,421,097 B2 | 9/2008 | Hamza et al. | |
| 8,025,239 B2 | 9/2011 | Labrec | |
| 8,374,402 B2 | 2/2013 | Black | |
| 8,532,343 B1 | 9/2013 | Freedman | |
| 2003/0215114 A1 | 11/2003 | Kyle | |
| 2004/0052404 A1 | 3/2004 | Houvener | |
| 2004/0218070 A1 | 11/2004 | Hamalainen | |
| 2005/0041840 A1 | 2/2005 | Lo | |
| 2007/0086626 A1 | 4/2007 | Mariani et al. | |
| 2007/0133843 A1 | 6/2007 | Nakatani | |
| 2009/0141940 A1 | 6/2009 | Zhao et al. | |
| 2009/0169062 A1* | 7/2009 | Cheung | G06Q 30/02 382/115 |
| 2010/0084462 A1 | 4/2010 | Scipioni et al. | |

* cited by examiner

*Primary Examiner* — Jayesh A Patel
(74) *Attorney, Agent, or Firm* — Sherrie M. Flynn; Coleman & Horowitz, LLP

(57) ABSTRACT

A method for verifying an identity attribute of a remote user includes providing pose instructions to a remote client from a host during an authentication session. The pose instructions may reference a specific physical token associated with the user, for example a government ID card, credit card, household object or printed or displayed image provided from an authentication host. The host receives an image from the client and may analyze the image to determine if the pose instructions were followed and if the physical token appears in the image. Based on this determination, and optionally using other factors, the host verifies an identity attribute of the user.

20 Claims, 2 Drawing Sheets

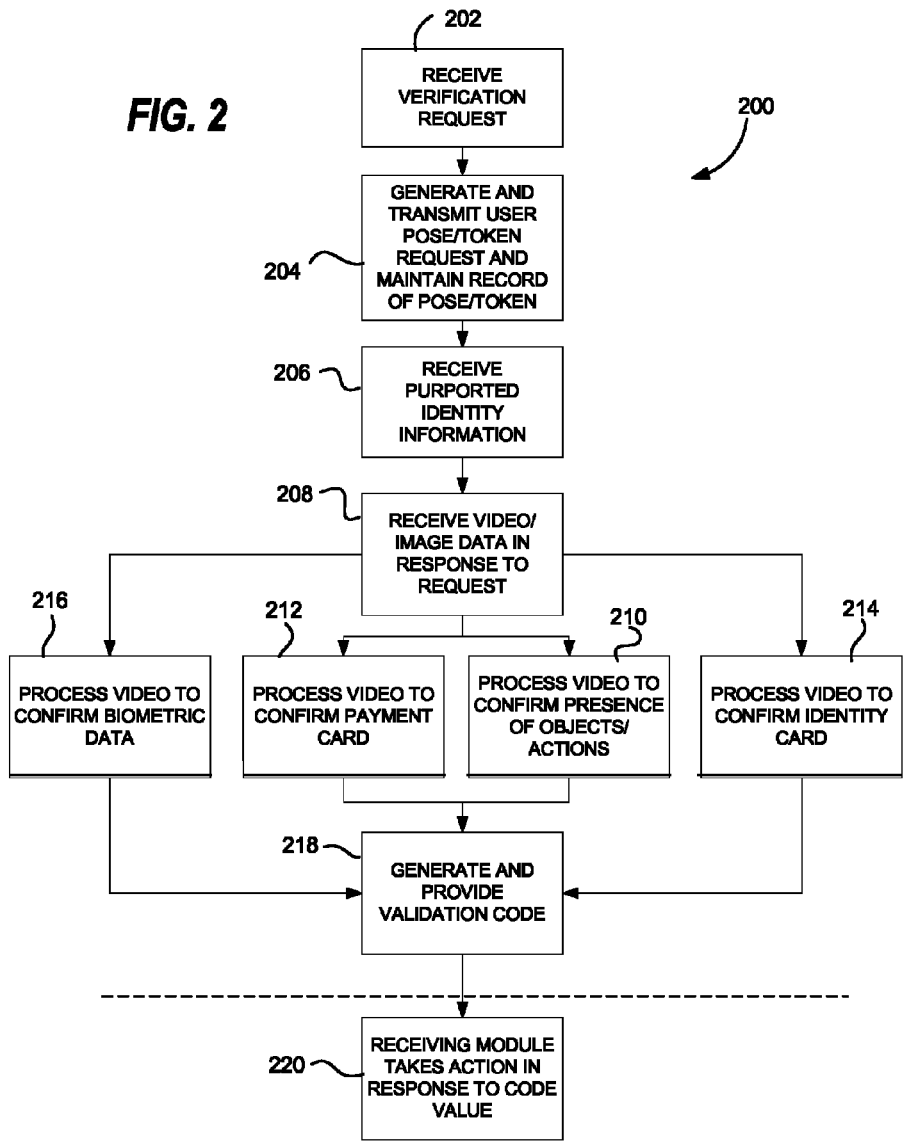

ONLINE IDENTITY VERIFICATION

CROSS-REFERENCE TO RELATED APPLICATION

This application claims priority pursuant to 35 U.S.C. §119(e) to U.S. non-provisional application Ser. No. 13/288,844, filed Nov. 3, 2011, which claims priority to U.S. provisional application Ser. No. 61/409833, filed Nov. 3, 2010, which is hereby incorporated by reference, in its entirety.

BACKGROUND

1. Field

This application relates to identity and identity attribute verification, and more particularly to identity or identity attribute verification of persons seeking to access an online or remote resource.

2. Description of Related Art

Online age and identity verification is a substantial problem. While credit cards have been utilized as a statutory mechanism to show age (see for example 47 U.S.C.A. §223(e)(5)(B)), the efficacy of this mechanism has been questioned by some commentators. Similarly, the use of stolen credit cards online is fairly simple, as the online merchant is unable to confirm identity by comparing identification cards with presenter's appearance and the name on the credit card, as might be done at a physical retail point of sale. For example, it may be relatively easy for children to pose as their parents while online, and thereby obtain access to adults-only online resources. This problem may arise most acutely in circumstances where online access is not already protected by a security feature such as a login name and password. For example, when setting a new user account to access online resources of any kind, all that is sometimes required is knowledge of identity information for an eligible adult and an payment account. Such requirements may not always be effective, especially in circumstances within a household wherein household members may have easy or routine access to identity and payment information for other members of the household.

In some situations, it is not necessary to verify a complete identity for a person attempting to access an online resource. For example, it may be undesirable or disadvantageous to require complete disclosure of user identity before providing access, while at the same time, it may be legally required or desirable to verify that the user possesses a certain identity attribute such as, for example, age, gender, place of residence or club membership before allowing a user to access online resources. An identity attribute may sometimes also be referred to as a "personal attribute." Some users, for example, may want to protect their identity and remain anonymous while accessing an online resource, but are willing to verify an attribute of their identity such as their age, etc., as a precondition to accessing their resource. However, identity theft security holes for remote verification, such as outlined above, may decrease the reliability of more limited identity attribute verification processes as well.

It would be desirable, therefore, to provide methods and systems for more effectively verifying the identity or identity attributes of remote users of online resources.

SUMMARY

The innovative methods and systems disclosed herein utilize one or more of face recognition technology, identification and credit card recognition technology, computer identification technology, internet session identification technology, utilization of real-time requests for images with set characteristics, validation codes, and database searching to confirm identity, age, or other characteristics of computer users. As used herein, a "user" refers to a natural person using a computer or client device.

In an aspect of the disclosure, a method for validating an identity attribute of a user operating a remote client may include maintaining, in a computer memory, a record associating the user to at least one physical token having a defined appearance. As used herein, a "physical token" is an article of manufacture that is adopted for use as a token. A physical token may be provided in a great variety of forms, a few examples of which are provided in the detailed description below. The method may further include transmitting pose instructions to the remote client, using a computer; wherein the pose instructions reference the at least one physical token. The method may further include receiving image data in response to the transmitting of pose instructions. For example, the image data may be received by a network component participating in the same verification session in which the pose instructions were transmitted to the client device. The method may further include performing image analysis of the image data using an automated algorithm and the record associating the user to the at least one physical token to determine an indication of whether or not the pose instructions were followed by the user so that an image of the at least one physical token appears with an image of the user in the image data. The method may further include validating the identity attribute of the user at least partly in response to the indication of whether or not the received image complies with the pose instructions and includes the correct physical token. It should be appreciated that validation may be contingent on analysis of additional parameters, in addition to the indication. Some examples of additional parameters are discussed below.

In a more particular aspect, the method may include sending instructions for the user to pose with the at least one physical token comprising at least one of an identity card or a payment card. For example, if the token is a government-issued identity card and the pose instructions specified that the user should hold the ID card to her forehead using her left hand, the image analysis may determine whether of not the received image shows a person holding an ID card of correct design to her forehead using her left hand.

In another aspect, the method may include performing image analysis of the image data using an automated algorithm to determine whether or not the at least one of the identity card or the payment card matches a known design. For example, if the physical token is an "American Express" credit card, the image analysis may include determining whether a card appearing in the image has an overall color and design matching a known design for "American Express" cards, or matching a particular card design registered to the user.

In another aspect, the method may include placing a requirement in the pose instructions that the at least one physical token be placed at a defined location within a frame of the image data. For example, the pose instructions may identify a particular token and instruct a user to pose with the token in a defined manner. The method may further include selecting the defined location from one of numerous possibilities; for example, the host computer may randomly select a particular pose/token combination from an array of hundreds or even thousands of possibilities.

In another aspect, the client node may be provided with a video capture device, and the image data may comprise video data. In such case, the method may configure the pose instructions to include a requirement for the user to take some defined action selected by the computer from numerous possible user actions to be captured by the video data. For example, the pose instructions may specify that the user raise the token above her head and hold it there for three seconds, pass the token from her right to her left hand, and so forth. Use of a video capture at the client may increase the number of practicably distinguishable poses from which a pose is selected, and thus make it more difficult for an image to be counterfeited.

In another aspect, the method may include transmitting a message containing image information to appear on the physical object in the image data as instructed by the pose instructions. For example, the image information may comprise a printable file containing a defined graphic design. The user may be instructed to print the design on a blank sheet of paper, and use the printed sheet as the physical token. For example, the defined graphic design may be, or may include, a two-dimensional ("2-D") bar code. Specific examples of 2-D bar codes may include, for example, Data Matrix and QR Code. It should be appreciated that since the physical token is used with a known specialized application for identity verification, the 2-D bar code may be configured according to a proprietary standard.

For further example, the image information (e.g., bar code) may include information formatted for display on a screen of an auxiliary imaging device in use by the user. Thus, the user may display the image information on a screen of an auxiliary device such as a mobile smart phone or tablet device, and pose with the auxiliary device displaying the image. In this example, the auxiliary device displaying the token image should be understood as the physical token used in the method described above.

In related aspects, the method may include validating the identity attribute of the user at least partly in response to a network address or phone number assigned to the remote client. In the alternative, or in addition, the method may include validating the identity attribute of the user at least partly in response to a network address or phone number assigned to a second remote auxiliary client from which the image data is transmitted to the computer. For further example, the method may include validating the identity attribute of the user at least partly in response to biometric data for the user appearing in the image data. In the case of biometric-related attribute verification, the method may be helpful for validating that the received image data pertains to the same person who has voluntarily received and executed the pose instructions. Thus, an attribute determined from biometric data (e.g., age, gender or identity) may be attributed to the user attempting to access the online resource.

In related aspects, an apparatus for identity verification may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as a network interface for remote communications and a dedicated graphics processor for processing image data from a remote client using an algorithm as described herein. Similarly, an article of manufacture may be provided, including a non-transitory computer-readable storage medium holding encoded instructions, which when executed by a processor, may cause a computer configured as an identity verification apparatus to perform the methods and aspects of the methods as summarized above.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention.

FIG. 2 is a flow chart showing aspects of a method for providing online identity and identity attribute verification for a remote user.

DETAILED DESCRIPTION

Figure 1:
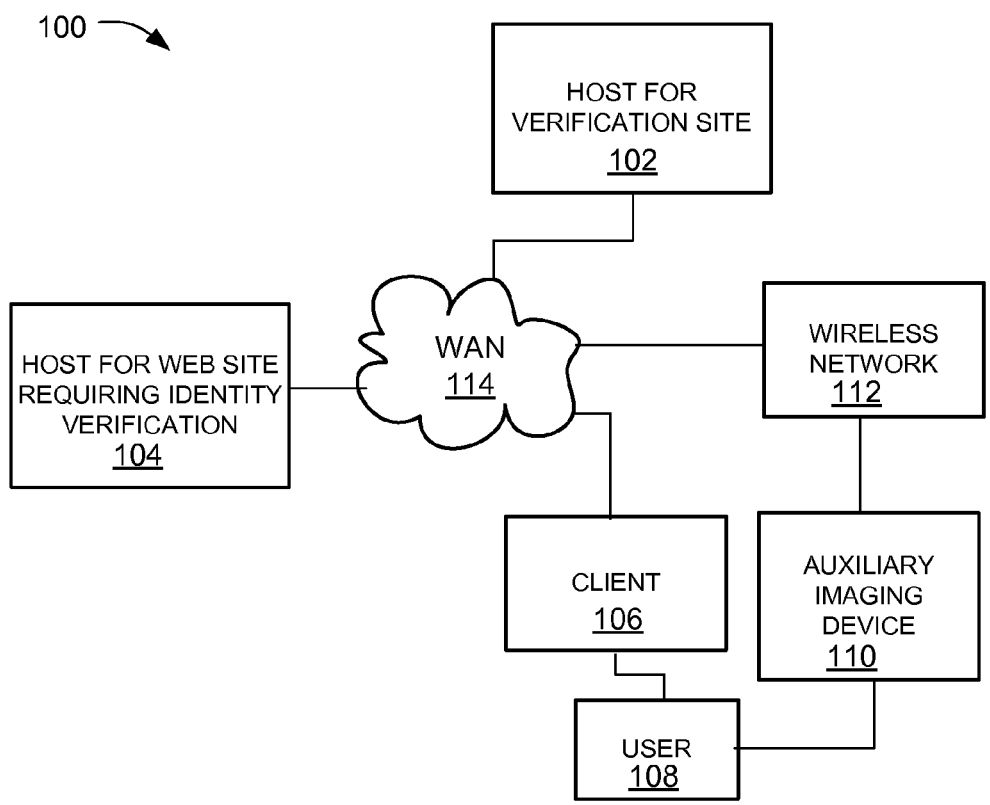
FIG. 1 is a schematic diagram showing an example of a system for providing online identity and identity attribute verification.

An example of a system 100 for providing online identity attribute verification is shown in FIG. 1. The system may comprise a client computer 106, for example, a personal computer, laptop computer, notebook computer, tablet computer, smart phone, set top box, game console, television with a network interface and digital processor, or the like, for accessing digital content using a display device to view video output from the client 106, in response to input from an input device. Client 106 may comprise a processor, memory, network interface, and computer graphics display driver for providing video output to a display device. A user interface, data and optionally digital audio-video content may be encoded on a non-transitory computer-readable medium coupled to the client 106, such as, for example, a magnetic, optical, or electronic data storage device or medium. The computer-readable medium may hold encoded instructions for performing certain actions as described herein, for example performing user interface functions as described herein.

The system 100 may further comprise one or more wireless networks 112 coupled to a wide area network (WAN) 114, for communicating with one or more wireless auxiliary imaging clients 110. It is contemplated that a wireless client 110 may include components that are generally the same as or similar to client 106, and perform the same or similar functions, although it may use a different operating system. For example, a user 108 may be accessing content at a web site hosted by the host 104 using a client such as a personal, laptop or notebook computer connected to WAN 114 via a wired connection such as a DSL subscriber line, T1 line or coaxial cable, while also having at hand a mobile phone or the like also capable of communicating via the WAN though a wireless communications network 112.

The client 106 may further comprise a network interface for communicating via the WAN 114, for example, the Internet. Via such an interface and network, the client may communicate with a first host 104 operating an application responsive to input from multiple clients, such as clients 106 and 110. The host 104 may be operating any application requiring a reliable identification or reliable determination of a personal attribute of the person using the client 106 to access the host.

For example, a user 108 may wish to access a particular URL, hosting a web site that requires payment by credit card and is further limited to users at least 21 years of age. The web site host 104 may redirect the user to a verification site host 102, operated by a trusted entity. The verification site host may have access to government identification records and/or credit card records by contractual arrangement with third parties providing for limited, secure access. The web site host 104 may include with the redirection to this site a request to confirm that the user is some identified person (for example, "Joe Smith"), that the proffered credit card is a valid one owned by "Joe Smith", and that "Joe Smith" is at least 21 years old. The verification host may receive the request 202 as part of a method 200 to be performed in cooperation with the requesting host 104 and the client 106, as shown in FIG. 2. The following discussion refers to elements of both FIGS. 1 and 2. Aspects of the method 200 shown in FIG. 2 pertaining to interactions between and operations of the verification host 102, web site host 104 and client 106 may sometimes be referred to herein as a "verification session."

In response to the request from the web site host site 104, the verification site 102 may generate and transmit a request 204 to the client 106, asking the user to pose in front of a web-cam connected to the client 106, as shown in FIG. 2. For example, the request may ask the user to sit in front of his web-cam and hold his state-issued identification card in his right hand and his credit card in his left hand. For added security, the verifying site may transmit a message containing a unique item to the client 106 or to the auxiliary imaging device 110, for example a printable PDF file containing a 2-D bar code or other graphic design. The user may use the client 106 and a connected printer to print the file on paper or cause it to be displayed on a screen of the auxiliary imaging device 110. In the alternative, or in addition, the verification host 102 may select (e.g., randomly) one of numerous commonly available items, for example one of a hairbrush, a shoe, a pen, a book, a cup, etc., and include in the posing requirements transmitted to client 106 a requirement that such item be placed at a defined location within the image, such as in the left hand under the credit card, or even in a subsequent frame of the image. Also at 204, the verification host may maintain a record associating the user to one or more physical tokens, as well as to the pose instructions selected for the verification session. For example, the verification host may create a record in a database or other data structure that lasts for the duration of the verification session, or longer, and indicates that particular pose instruction including the particular physical token or tokens used for the verification session.

The verification host 102 may likewise select the defined location from one of numerous possibilities. In addition or in the alternative, the verification host 102 may include in the posing instructions a requirement for the user to take some defined action, again selected by the computer from numerous possible actions, for example moving, raising or waving a specified appendage. Providing posing instructions from the verification host 102 to the client 108 may help to prevent use of a pre-recorded video of a person whose identity is being stolen.

The verification host may also specify a source for the video or still image to be supplied by the user 108. For example, the posing instructions may request a video file recorded by a web-cam connected to the client 106, or may permit an electronic photograph or video image to be captured taken via a different non-computer-connected device and loaded onto the client. In the alternative, or in addition, the instructions may specify that the video or still image be collected and transmitted from an auxiliary imaging device 110, for example a camera phone. A camera phone may be useful particularly if it is assigned a phone number in the wireless network 112 belonging to an account that matches the user, e.g., John Smith. For example, the verification host may ask for a phone number from the user, send an SMS message to the designated phone including instructions for uploading a video or still image from the phone to the verification host, and verify that the provided phone number is assigned to person providing the number. For further example, the verification host may require or permit images of the credit and/or identification cards to be submitted via a document scanner for greater clarity, as duplicate images of the documents appearing in the posed photographs or otherwise. At 208, the verification host may therefore receive a video and/or still image file from one or more specified clients.

In some cases the resolution of the web-cam or other camera used by the client 106 or auxiliary imaging device 110 may be too low for identification data appearing in the web-cam video, for example an identification card number or credit card number to be read by software; or the desired identification numbers may be illegible in the client video for other reason. Therefore, in response to determining that the desired information is illegible, or merely to confirm legible information, the verification host may transmit a message to the client 106 asking the user to input specific identifying information via a user input device (for example, a keyboard, keypad, touchscreen or microphone) for comparison with identification information accessible to the verification host 102 from other sources, for example, credit card numbers or state-issued driver's license numbers. In an embodiment, the requesting host 108 may pass the identifying information to the verifying site 102, after the requesting host 108 has first obtained the identifying information. In summary, the verification host may receive identity information 206 ultimately supplied by the user 108 and purporting to belong to such user, whether through the client 106 or host 104. The verification host 102 may operate to determine a likelihood that the supplied identity information actually belongs to the user 108 communicating with the hosts 102 and 104 using the client 106.

After receiving the identifying information 206 from the client 106 and/or from the requesting host 104 and receiving the video or still image data 208 as described above, the verifying host 102 may perform certain operations 210-218 as shown in FIG. 2, which may be performed serially, in parallel or in any useful order. At 210, the verification host may process the received video or still image data to confirm that the unique objects or actions are present in the video stream, still photograph or moving image. That is, the verification host may determine, using an automated algorithm performing image analysis and the record associating the user to the pose instructions and one or more physical tokens for the verification session, whether or not the pose instructions supplied by the verification host to the client 106 have been followed. Technology exists to recognize and search for objects contained within images. See, for example, U.S. Pat. No. 7,460,737, "Method and Apparatus for Photograph Finding". Technology also exists to recognize faces as one category of objects within photographs, and to analyze facial features, and may be used for image analysis.

At 212, the verification host may determine using an automated algorithm performing image analysis of the supplied video or still image data whether or not a credit card present in the image matches an actual credit card image on file with the issuer. For example, a card issuer may issues numerous cards with one or more different designs, therefore the design appearing in the image data may be compared with known designs associated with that card number, using an image comparison algorithm. In addition, if applicable, image analysis may be performed to determine whether a signature on the reverse of the card matches a signature on record for the card holder or record.

At 214, the verification host may determine using an automated algorithm performing image analysis of the supplied video or still image data whether or not an identification card appearing in the image data matches an identification card on file with an issuing agency. For example, an identification card with an altered birth date, or with a substituted photograph, will not match the image of any identification card on file with the issuing agency. A comparison algorithm may flag a mismatch for review by a human operator or may simply respond to a mismatch by appropriate adjustment of a verification score.

At 216, the verification host may determine using an automated algorithm performing image analysis of the supplied video or still image data whether biometric data appearing in the image data matches known biometric data for the purported user. For example, the host may identify a face appearing within the image or video and compare it utilizing existing facial recognition technology with the face on file in the photograph associated with the identification and/or credit card, to the extent that the credit card company may have an image of the user. In the alternative, and for further example, biometric data previously used in conjunction with that card number, or some of its characteristics, may be stored and used in the extant verification attempt compared to biometric data used in the prior use of the card. The host 102 may respond to a failure to match by flagging the credit card as potentially compromised.

For further example, and in an alternative application of the present technology, biometric data such as analysis of facial characteristics may be used merely to discern an age or gender of the person appearing in the image, while enabling the person to remain anonymous. In this example, other identifying information (e.g., the facial image) may be discarded by the verification host after making a determination of age and/or gender based on a facial image. The verification host 102 may provide a signal (e.g., validation code) to the web site 104 indicating that the biometric analysis of the image data is consistent with the user 108 meeting specified age or gender requirements. In other words, the verification host may make this determination without determining the full identity of the user. Therefore so long as the verification host is trustworthy and actually destroys personally identifiable image data after making an age determination, the user may have confidence that she is accessing the site 104 as an anonymous user whose identity cannot be determined once the verification host destroys the image data from the verification session. In other embodiments, the verification host may perform full identity verification or may preserve personally identifiable image data for the verification session, while limiting the signal to the host 104 to information indicating whether the user 108 meets requirements for accessing the site anonymously. In these embodiments, the identity of the user is known (or may be discernable) to the verification site 102 but not to the web site 104.

At 218, the verification host may return the user to the requesting web site provided with an validation code, as a way of validating the identity attribute of the user. This validation may be performed at least partly in response to the confirmation operation described in connection with block 210. The validation code may comprise a secure, for example encrypted, code indicating whether or not the user is likely to be the person to whom the purported identifying information belongs, or is likely to possess the required personal attributes (for example, age, gender, place of residence or membership in a required organization or subscribership). The indication may be expressed as a probability or confidence level, for example, 99.9%, 90%, 80% 50% or 0% confidence that the user is actually the identified person or possess a required personal attribute or attributes. The validation code may be given to the user or to the requesting site in any suitable way; for example, embedded in a cookie, embedded in a URL, by making an entry in a database accessible by the requesting site accessed by a specific information set or by searching for a code generated by a formulaic combination of IP address, browser characteristics, and/or other unique or semi-unique computer or connectivity characteristics; or given to the user in the form of a printed validation (such as a 2-D bar code). The validation code may be used alone, but in an embodiment, the verification host embeds information about a specified object in the validation code so that it may be used only in combination with such specified object, for example a credit card or identification card, to validate that the owner of the credit card or identification card is the person attempting to use it.

The requesting site therefore receives and then decodes or otherwise processes in the validation code passed by the verifying site either directly, via database access, via embedded code within the URL or cookie, via code entered by the user, or otherwise. The requesting host 104 may take action based on whether the verifying site 102 confirmed or denied the validity of the information the user presented. In one implementation, the probability that the user matches the proffered data may be passed to the requesting site (i.e. "80% likelihood that the user pictured is the one who was issued the identification card"), so that the requesting site may take action according to its own rules. For example, a host rule may specify that anything under a 95% probability may require the user to talk to a human verification employee prior to continuing.

Other methods of recording biometric data may be used in conjunction with the methods outlined above. For example, facial biometric data may be collected by reading facial characteristics from physical application of the face to a surface capable of measuring such characteristics. For further example, a user may alternatively hold the right and then the left side of his face (or just one side if sufficient data is obtained) against a touch screen interface. Even pressing a face against a standard keyboard may generate sufficient data about facial characteristics as to permit a rudimentary risk assessment of identity theft. An alternative mechanism may be to compare the fingerprint generated from a fingerprint reader, or read by holding a finger up to an imaging device, against the fingerprint on file with an identification issuer.

The validation code may be time-stamped and may (a) expire automatically after some period of time; (b) expire when the user requests it expire, either as expressed at the time of issuance or subsequently; (c) simply be used part of the data the requesting site holds and accepted or not accepted based on the policies of the requesting site; (d) be tied to the IP address of the physical machine, and expire upon attempted use from a different IP address; or (e) expire on a differential time basis depending on the measured risk that the verification was invalid (so a 99% valid identification might last longer than a 90% valid identification).

The verification host may cause the validation code to be issued in such a manner (for example, with a printed 2-D bar code containing the validation information) that any site utilizing this mechanism would be able to recognize a validated identification. In another embodiment, the verification host may recognize a subsequent request for validation of the same information originates from the same or similar IP addresses or with other characteristics similar or identical to those present in the original request, and so long as the validity period has not expired, would return the user as validated to the requesting site without requiring interaction from the user, for example using 302 Moved HTTP responses so that validation occurs in a manner unobtrusive to the user. In the alternative, a user validating the same information for a different requesting site may be validated by utilizing a subset of the validation requirements requested in the original request. Similarly, a user with an aging validation may be validated using a subset of the validation requirements requested in the original request. Such subset could include a summary of data encoded into a special code printed or given to the user.

Unique computer and network characteristics may include IP address, MAC address, serial number of CPU, serial number of hard drive, serial number of software loaded on the computer, cadence of user typing, characteristics of the data input devices such as web-cams, or mechanisms already used to uniquely identify computers and/or network connections. Such characteristics may be used to identify a client device used by a user during a verification session with a verification host. The identity of the client device may be another factor used in assessing a confidence level concerning the user's identity or possession of specified personal attributes.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" as used herein is intended to encompass a computer program accessible from any computer-readable device, carrier, or media. For example, non-transitory computer-readable media may include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Of course, those skilled in the art will recognize many modifications may be made to this configuration without departing from the scope of the disclosed aspects.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium (i.e., a non-transitory computer-readable medium) may be coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks are necessarily required to implement the methodologies described herein, as some of the illustrated blocks pertain to optional or additional aspects and are so described. Additionally, it should be further appreciated that the methodologies disclosed herein are capable of being encoded as instructions on a non-transitory computer-readable medium. When executed by a processor, the encoded instructions may cause a computer to perform one or more operations of the methodologies.

The foregoing embodiments merely exemplify various apparatus and systems for online identity verification. The present technology is not limited by these examples.

What is claimed is:

1. A method for validating a personal characteristic of an anonymous person operating a remote client, comprising:
   transmitting pose instructions to the remote client using a computer, wherein the pose instructions comprise:

image information formatted for display on a screen of an auxiliary imaging device in use by the anonymous person;

directing the anonymous person to pose in at least one distinctive pose with the image information displayed on the screen of the auxiliary imaging device, and the auxiliary imaging device placed in a defined location during an image capture process;

receiving image data in response to the transmitting of pose instructions, the image data including biometric data of the person;

performing image analysis of the image data using a first automated algorithm to determine whether or not the person is posed and the image information displayed as instructed; and estimating a value of the personal characteristic based on an analysis of the biometric data, using a second automated algorithm.

2. The method of claim 1, further comprising destroying the image data immediately after estimating the value of the personal characteristic, without determining an identity of the person.

3. The method of claim 1, wherein the personal characteristic comprises at least one of: an approximate age of the person or a gender of the person.

4. The method of claim 1, wherein the image data comprises video data, and further comprising including in the pose instructions a requirement for the user to take some defined action selected by the computer from numerous possible user actions to be captured by the video data.

5. The method of claim 1, wherein the pose instructions further comprise directing the anonymous person to place at least one physical token having a defined appearance at a defined location within a frame of the image data.

6. The method of claim 5, further comprising selecting the defined location from one of numerous possibilities.

7. The method of claim 5, further comprising, maintaining, in a computer memory, a record associating the user to the at least one physical token.

8. The method of claim 1, further comprising, maintaining in a computer memory, a record associating the user to the pose instructions and the image information.

9. The method of claim 8, wherein the image information comprises a bar code.

10. The method of claim 1, further comprising determining an estimated confidence level for the value of the personal characteristic.

11. An apparatus for validating a personal characteristic of an anonymous person operating a remote client, the apparatus comprising a processor coupled to a memory, said memory encoded with instructions, which when executed by the processor, causing the apparatus to perform operations including:

transmitting pose instructions to the remote client, wherein the pose instructions comprise image information formatted for display on a screen of an auxiliary imaging device in use by the anonymous person, and directing the anonymous person to pose in at least one distinctive pose with the image information displayed on the screen of the auxiliary imaging device, and the auxiliary imaging device placed in a defined location during an image capture process;

receiving image data in response to the transmitting of pose instructions, the image data including biometric data of the person;

performing image analysis of the image data using a first automated algorithm to determine whether or not the person is posed and the image information displayed as instructed; and estimating a value of the personal characteristic based on an analysis of the biometric data, using a second automated algorithm.

12. The apparatus of claim 11, wherein the memory holds further instructions for destroying the image data immediately after estimating the value of the personal characteristic, without determining an identity of the person.

13. The apparatus of claim 11, wherein the memory holds further instructions for estimating the personal characteristic comprising at least one of: an approximate age of the person or a gender of the person.

14. The apparatus of claim 11, wherein the memory holds further instructions for performing the analysis of the image data comprising video data, and further comprising including in the pose instructions a requirement for the user to take some defined action selected by the computer from numerous possible user actions to be captured by the video data.

15. The apparatus of claim 11, wherein the memory holds further instructions for directing the anonymous person to place at least one physical token having a defined appearance at a defined location within a frame of the image data.

16. The apparatus of claim 15, wherein the memory holds further instructions for selecting the defined location from one of numerous possibilities.

17. The apparatus of claim 15, wherein the memory holds further instructions for maintaining a record associating the user to the at least one physical token.

18. The apparatus of claim 11, wherein the memory holds further instructions for maintaining a record associating the user to the pose instructions and the image information.

19. The apparatus of claim 17, wherein the memory holds further instructions for transmitting the image information comprising a bar code.

20. The apparatus of claim 11, wherein the memory holds further instructions for determining an estimated confidence level for the value of the personal characteristic.

* * * * *